United States Patent
Lim et al.

(10) Patent No.: US 10,708,359 B2
(45) Date of Patent: Jul. 7, 2020

(54) CENTRAL COMMUNICATION UNIT OF A MOTOR VEHICLE

(71) Applicant: Bayerische Motoren Werke Aktiengesellschaft, Munich (DE)

(72) Inventors: Hyung-Taek Lim, Munich (DE); Christian Lottermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 73 days.

(21) Appl. No.: 15/205,580

(22) Filed: Jul. 8, 2016

(65) Prior Publication Data

US 2016/0374122 A1    Dec. 22, 2016

Related U.S. Application Data

(63) Continuation of application No. PCT/EP2014/075819, filed on Nov. 27, 2014.

(30) Foreign Application Priority Data

Jan. 9, 2014    (DE) .................. 10 2014 200 226

(51) Int. Cl.
*H04L 29/08* (2006.01)
*H04W 4/40* (2018.01)
(Continued)

(52) U.S. Cl.
CPC .............. *H04L 67/12* (2013.01); *H04W 4/40* (2018.02); *H04W 76/10* (2018.02); *H04H 20/62* (2013.01); *H04W 84/005* (2013.01); *H04W 84/12* (2013.01)

(58) Field of Classification Search
CPC ................. H04L 67/12; H04L 41/0896; H04L 47/70–829; H04W 4/046; H04W 84/005;
(Continued)

(56) References Cited

U.S. PATENT DOCUMENTS 5,751,708 A * 5/1998 Eng ...................... H04L 12/2801
370/310.1
6,021,263 A * 2/2000 Kujoory .............. H04L 12/5602
370/409
(Continued)

FOREIGN PATENT DOCUMENTS

DE    10 2008 037 880 A1    3/2009
DE    10 2008 009 330 A1    6/2009
(Continued)

OTHER PUBLICATIONS

International Search Report (PCT/ISA/210) issued in PCT Application No. PCT/EP2014/075819 dated Feb. 25, 2015, with English translation (six (6) pages).
(Continued)

*Primary Examiner* — Dung B Huynh
(74) *Attorney, Agent, or Firm* — Crowell & Moring LLP (57) ABSTRACT

A central communication unit of a motor vehicle and to a method for controlling the communication between a plurality of applications by way of such a central communication unit are provided. The central communication unit has a communication organization module, which can actively distribute the available external radio connection capacities between the central communication unit and at least one transmitting/receiving device to individual active data connections of the applications in accordance with predetermined criteria. In the central communication unit, the available external radio connection capacities are distributed among the individual data connections of the individual applications in a specific, controlled manner. The criteria for this are the demand for connection capacity and/or the priorities of the different data connections.

13 Claims, 6 Drawing Sheets

US 10,708,359 B2
Page 2

(51) Int. Cl.
*H04W 76/10* (2018.01)
*H04H 20/62* (2008.01)
*H04W 84/00* (2009.01)
*H04W 84/12* (2009.01)

(58) Field of Classification Search
CPC ..... H04W 84/12; H04W 16/22; H04W 76/10; H04W 28/0215; H04W 28/10; H04W 16/04; H04W 4/40; B60R 16/023
See application file for complete search history.

(56) References Cited

U.S. PATENT DOCUMENTS

| | | | | |
|---|---|---|---|---|
| 6,072,787 | A * | 6/2000 | Hamalainen | H04J 3/1647 370/335 |
| 6,097,733 | A * | 8/2000 | Basu | H04L 29/06027 370/329 |
| 6,590,865 | B1 * | 7/2003 | Ibaraki | H04L 12/40058 370/230 |
| 6,640,248 | B1 * | 10/2003 | Jorgensen | H04L 1/20 370/328 |
| 6,778,596 | B1 * | 8/2004 | Tzannes | H04L 1/0025 375/222 |
| 6,947,750 | B2 * | 9/2005 | Kakani | H04L 41/0896 370/230 |
| 8,032,409 | B1 * | 10/2011 | Mikurak | G06Q 10/00 705/14.39 |
| 8,514,825 | B1 * | 8/2013 | Addepalli | H04W 4/046 370/338 |
| 8,670,897 | B1 * | 3/2014 | Ralson | G06F 11/3013 701/36 |
| 8,677,372 | B2 * | 3/2014 | Axnix | G06F 9/45533 709/226 |
| 8,867,915 | B1 * | 10/2014 | Vandat | H04B 10/27 398/55 |
| 9,001,641 | B2 * | 4/2015 | Bertrand | H04J 13/0062 370/210 |
| 9,332,547 | B1 * | 5/2016 | Ghavami | H04W 72/0453 |
| 9,638,537 | B2 * | 5/2017 | Abramson | G01C 21/3626 |
| 9,674,861 | B1 * | 6/2017 | Pawar | H04W 72/1242 |
| 2002/0075844 | A1 * | 6/2002 | Hagen | H04L 63/0442 370/351 |
| 2003/0108059 | A1 * | 6/2003 | Yew | H04L 47/15 370/443 |
| 2003/0129988 | A1 * | 7/2003 | Lee | H04W 28/16 455/450 |
| 2003/0130005 | A1 * | 7/2003 | Weisshaar | H04W 48/14 455/525 |
| 2003/0135632 | A1 * | 7/2003 | Vrzic | H04L 47/14 709/231 |
| 2003/0139179 | A1 | 7/2003 | Fuchs et al. | |
| 2003/0152096 | A1 * | 8/2003 | Chapman | H04L 47/803 370/412 |
| 2003/0157975 | A1 * | 8/2003 | Kadel | H04W 84/005 455/41.2 |
| 2003/0177179 | A1 * | 9/2003 | Jones | H04L 29/06 709/203 |
| 2003/0202532 | A1 * | 10/2003 | Peelen | H04L 47/13 370/465 |
| 2004/0136379 | A1 * | 7/2004 | Liao | H04L 47/10 370/395.21 |
| 2004/0143663 | A1 * | 7/2004 | Leedom | H04L 47/15 709/226 |
| 2004/0185842 | A1 * | 9/2004 | Spaur | B60R 25/04 455/420 |
| 2004/0190528 | A1 * | 9/2004 | Dacosta | H04L 41/0896 370/395.41 |
| 2004/0199635 | A1 * | 10/2004 | Ta | H04L 41/0893 709/226 |
| 2004/0208183 | A1 * | 10/2004 | Balachandran | H04L 47/10 370/395.21 |
| 2004/0254700 | A1 | 12/2004 | Fehr et al. | |
| 2004/0257994 | A1 * | 12/2004 | Paskett | H04L 47/10 370/230 |
| 2005/0160171 | A1 * | 7/2005 | Rabie | H04L 41/0893 709/227 |
| 2005/0163059 | A1 * | 7/2005 | Dacosta | H04L 41/0896 370/252 |
| 2005/0163504 | A1 * | 7/2005 | Bernard | H04J 14/0227 398/33 |
| 2005/0286873 | A1 * | 12/2005 | Kamogawa | G11B 20/10 386/213 |
| 2006/0072144 | A1 * | 4/2006 | Dowling | G06F 21/606 358/1.15 |
| 2006/0160555 | A1 * | 7/2006 | Kobayashi | H04L 45/00 455/522 |
| 2006/0168081 | A1 * | 7/2006 | Okada | G06F 9/50 709/207 |
| 2006/0178918 | A1 * | 8/2006 | Mikurak | G06Q 10/06 705/7.25 |
| 2007/0064604 | A1 * | 3/2007 | Chen | H04L 1/0002 370/230 |
| 2007/0103289 | A1 * | 5/2007 | Dagci | G08B 25/007 340/521 |
| 2007/0147836 | A1 * | 6/2007 | Dong | H04B 10/073 398/71 |
| 2007/0153802 | A1 | 7/2007 | Anke et al. | |
| 2007/0171915 | A1 * | 7/2007 | Toyama | H04L 47/15 370/395.21 |
| 2007/0180119 | A1 * | 8/2007 | Khivesara | H04L 12/1881 709/226 |
| 2007/0217349 | A1 * | 9/2007 | Fodor | H04L 12/5692 370/310.2 |
| 2008/0025219 | A1 * | 1/2008 | Chao | H04L 47/10 370/235 |
| 2008/0153422 | A1 * | 6/2008 | Gilbertas | H04L 43/0894 455/67.11 |
| 2008/0285578 | A1 * | 11/2008 | DeLay | G06F 9/546 370/412 |
| 2009/0103438 | A1 * | 4/2009 | Groh | H04W 72/1242 370/235 |
| 2009/0240808 | A1 * | 9/2009 | Chen | H04L 41/0896 709/226 |
| 2010/0041397 | A1 * | 2/2010 | Chutorash | H04W 48/18 455/432.1 |
| 2010/0128659 | A1 * | 5/2010 | Dziong | H04B 7/18539 370/316 |
| 2010/0214943 | A1 * | 8/2010 | Immendorf | H04W 24/00 370/252 |
| 2010/0234071 | A1 * | 9/2010 | Shabtay | H04W 7/0408 455/562.1 |
| 2010/0302958 | A1 * | 12/2010 | Wietfeldt | H04W 76/15 370/252 |
| 2010/0332667 | A1 * | 12/2010 | Menchaca | H04L 67/322 709/228 |
| 2011/0164594 | A1 | 7/2011 | Staehlin et al. | |
| 2011/0195699 | A1 * | 8/2011 | Tadayon | H04B 5/0062 455/418 |
| 2011/0209091 | A1 * | 8/2011 | Bucciarelli | B60K 35/00 715/825 |
| 2011/0310840 | A1 * | 12/2011 | Kennedy | H04W 48/14 370/331 |
| 2012/0036513 | A1 * | 2/2012 | Choong | H04L 41/0896 718/104 |
| 2012/0066007 | A1 * | 3/2012 | Ferrick | G06Q 30/0283 705/4 |
| 2012/0077506 | A1 * | 3/2012 | Wietfeldt | H04W 72/02 455/450 |
| 2012/0163361 | A1 | 6/2012 | Moeller et al. | |
| 2012/0225634 | A1 * | 9/2012 | Gee | H04W 4/90 455/404.2 |
| 2012/0240205 | A1 * | 9/2012 | Casey | H04L 47/10 726/5 |
| 2012/0275445 | A1 * | 11/2012 | Karlsson | H04W 8/183 370/338 |
| 2013/0006726 | A1 * | 1/2013 | Tijink | G07B 15/063 705/13 |

(56) References Cited

U.S. PATENT DOCUMENTS

| | | | | |
|---|---|---|---|---|
| 2013/0022054 A1* | 1/2013 | Goodermuth | H04L 47/805 | 370/431 |
| 2013/0035083 A1* | 2/2013 | Kadel | H04W 84/005 | 455/418 |
| 2013/0058214 A1* | 3/2013 | Foglar | H04L 41/5022 | 370/230.1 |
| 2013/0100955 A1* | 4/2013 | Dunlap | H04L 47/76 | 370/392 |
| 2013/0103779 A1* | 4/2013 | Bai | H04L 67/2833 | 709/213 |
| 2013/0159466 A1* | 6/2013 | Mao | H04L 67/12 | 709/218 |
| 2013/0159494 A1* | 6/2013 | Danda | H04L 41/5067 | 709/224 |
| 2013/0201316 A1* | 8/2013 | Binder | H04L 67/12 | 348/77 |
| 2013/0301584 A1* | 11/2013 | Addepalli | H04W 4/046 | 370/329 |
| 2013/0310021 A1* | 11/2013 | Bergek | H04W 84/005 | 455/422.1 |
| 2013/0329598 A1* | 12/2013 | DiFazio | H04W 64/003 | 370/254 |
| 2013/0331108 A1* | 12/2013 | Otomo | H04W 40/12 | 455/445 |
| 2013/0337813 A1* | 12/2013 | Van Phan | H04W 36/08 | 455/436 |
| 2013/0339537 A1* | 12/2013 | Joy | H04L 65/1083 | 709/231 |
| 2013/0343289 A1* | 12/2013 | Pang | H04W 72/046 | 370/329 |
| 2014/0045541 A1* | 2/2014 | Moshfeghi | H04W 84/00 | 455/500 |
| 2014/0051456 A1* | 2/2014 | Bai | H04W 48/18 | 455/452.2 |
| 2014/0199990 A1* | 7/2014 | Wolcott | H04W 72/02 | 455/422.1 |
| 2014/0211698 A1* | 7/2014 | Aguirre | H04W 28/085 | 370/329 |
| 2014/0226571 A1* | 8/2014 | Das | H04L 41/0896 | 370/329 |
| 2014/0306817 A1* | 10/2014 | Ricci | H04W 4/21 | 340/457 |
| 2015/0019740 A1* | 1/2015 | Zhao | H04L 41/5022 | 709/226 |
| 2015/0098390 A1* | 4/2015 | Efrati | H04W 72/02 | 370/329 |
| 2015/0124607 A1* | 5/2015 | Kotecha | H04W 72/1242 | 370/235 |
| 2015/0131514 A1* | 5/2015 | Lauer | H04L 12/189 | 370/312 |
| 2015/0289279 A1* | 10/2015 | Xu | H04W 72/0486 | 370/329 |
| 2016/0226703 A1* | 8/2016 | Grinshpun | H04W 24/08 | |
| 2017/0303273 A1* | 10/2017 | Jin | H04L 47/76 | |
| 2019/0014053 A1* | 1/2019 | Huang | H04L 47/00 | |

FOREIGN PATENT DOCUMENTS

| | | |
|---|---|---|
| EP | 2 133 849 A1 | 12/2009 |
| GB | 2475110 A | 5/2011 |
| WO | WO 2010/130737 A1 | 11/2010 |

OTHER PUBLICATIONS

German Search Report issued in counterpart German Application No. 10 2014 200 226.5 dated Mar. 3, 2014, with partial English translation (eight (8) pages).

Chinese Office Action issued in Chinese counterpart application No. 201480072780.9 dated Apr. 11, 2019 (Ten (10) pages).

* cited by examiner

| DV | FK | ZD | BB | FR | LT | DK |
|---|---|---|---|---|---|---|
| A | 2 | 6000 | 7000 | 2 | 2 | 0,0001 |
| B | 1 | 1000 | 12000 | 3 | 1 | 0,00001 |
| C | 1 | 11000 | 12000 | 3 | 1 | 0,00001 |
| C | 2 | 1000 | 7000 | 2 | 2 | 0,0001 |
| C | 3 | 1000 | 6000 | 1 | 3 | 0,0001 |

FIG. 3B

| APP | ZDV | GD | KL | PR | MIN | MAX | MFR | MLT |
|---|---|---|---|---|---|---|---|---|
| X | A | 6000 | 4 | - | 3000 | 6000 | 2 | 2 |
| Y | B | 1000 | 2 | - | 1000 | 1000 | 3 | 2 |
| Z | C | 13000 | 3 | - | 5000 | 13000 | 5 | 5 |

CENTRAL COMMUNICATION UNIT OF A MOTOR VEHICLE

CROSS REFERENCE TO RELATED APPLICATIONS

This application is a continuation of PCT International Application No. PCT/EP2014/075819, filed Nov. 27, 2014, which claims priority under 35 U.S.C. § 119 from German Patent Application No. 10 2014 200 226.5, filed Jan. 9, 2014, the entire disclosures of which are herein expressly incorporated by reference.

BACKGROUND AND SUMMARY OF THE INVENTION

The present invention relates to a central communication unit of a motor vehicle. In particular, the present invention relates to a central communication unit of a motor vehicle having a number of connection modules for establishing a wireless data connection between the motor vehicle and at least one transmitting/receiving device located outside of the motor vehicle.

In the case of conventional motor vehicles, the communication between so-called on-board components in the motor vehicle with communication partners outside of the motor vehicle is implemented by means of a communication unit TCB (Telematic Communication Box). In the meantime, motor vehicles contain a multiplicity of devices or on-board components which, when used, need a data link such as, for example, an Internet radio, navigation system with Internet connection, information systems for loading messages etc., and rescue systems which, in the case of an accident, automatically transmit an emergency call. Each on-board component requires a separate communication unit. This results in considerable production costs and the number of communication units is limited due to the limited installation space in a motor vehicle so that it is not possible to provide an arbitrary number of communication units and not possible to provide an arbitrary number of on-board components with a radio link.

For this reason, a central communication unit ATM (Advanced Telecommunication Module) was developed. This central communication unit has a number of connection modules which can establish in each case a radio link according to a particular radio standard. This includes, for example, cellular systems (3G, 4G) and also local, radio-based networks (IEEE 802.11, IEEE 802.16). By this means, the central communication unit can establish a radio link with different standards and, if necessary, even setup a number of radio links on different radio channels in parallel. By means of the central communication module, a data link can thus be established and maintained even if different types of radio networks are available at different positions of the motor vehicle during a trip, the data link being maintained simultaneously or successively via different radio channels with different radio standards. By this means, the optimum radio channel between the motor vehicle and a communication partner located outside the motor vehicle can be selected automatically. The central communication module distributes the existing data rate of the radio links or of the radio channels, respectively, to the individual on-board components.

In the case of simple central communication units, only a single application executed on an on-board component can in each case access the data link between the central communication unit and the external communication partner. There are also central communication units in which a number of applications can communicate virtually simultaneously via the central communication unit. In this case, the data are forwarded without using a prioritization mechanism, for example according to the FIFO principle (First-In First-Out), this being applied to data packets, messages and/or to the entire data link of the respective application.

In the case of the conventional solution comprising a number of separate communication units, all on-board components, to which one communication unit is allocated in each case, can obtain a radio link separately. However, the production and data transmission costs for a multiplicity of communication units are considerable. The number of communication units is limited by the limited installation space. In addition, the multiplicity of communication units will be designed to be relatively simple so that each communication unit can establish at least one radio link or a link via a radio channel according to a particular radio standard (e.g. WLAN, GSM, 3G/UMTS, 4G/LTE).

In the case of the evolving solution by means of a central communication unit, the advantage is that the radio link is switched automatically to the best and/or most advantageous available radio network so that an optimum data link exists. If, however, a number of applications wish to use a data link simultaneously, the problem exists that the individual applications can block each other. In particular, applications which wish to transmit a large volume of data can impair applications which only wish to transmit a small volume of data to such an extent that the applications with a small volume of data are virtually inoperative. This is particularly critical when the applications with a small volume of data are applications which are important to the vehicle driver such as, for example, the transmission of traffic messages or the transmission of an emergency call. If these are impaired by downloading music or a film, this is of considerable disadvantage to the vehicle driver.

The invention is based on the object, therefore, to extend a central communication unit of a motor vehicle in such a manner that a number of applications can communicate efficiently and reliably simultaneously with external communication partners via one or more radio channels.

This and other objects are achieved in accordance with the embodiments of the invention.

An inventive central communication unit of a motor vehicle comprises a number of connection modules for establishing a wireless data link between the motor vehicle and at least one transmitting/receiving device located outside the motor vehicle, and a connection module manager for controlling the connection modules in order to provide a suitable data link between the motor vehicle and the at least one transmitting/receiving device, a data network for connecting a number of devices within the motor vehicle, wherein a number of applications, which can be executed on the devices, can in each case utilize a data link via the central communication unit to the transmitting/receiving device.

The central communication unit is characterized by a communication organization module which is designed in such a manner that the available external connection capacities between the central communication unit and the at least one transmitting/receiving device are distributed actively in accordance with predetermined criteria to the individual active data links of the applications.

The available external connection capacities are the connection capacities of the individual radio channels, the connection capacity of a radio channel basically being the result of the bandwidth or the data rate of the radio channel, respectively. Further parameters such as, e.g., the error rate or the latency can be included in the determination of the connection capacity of the respective radio channel.

A radio channel is a radio link of one or more motor vehicles over a particular frequency of a radio system with a transmitting/receiving device located outside the motor vehicle, i.e. that the connection capacity of the radio channel is distributed to the number of motor vehicles. The distribution is carried out in accordance with the time division multiplex method.

The distribution of the external connection capacities can also be carried out by assigning particular radio channels to particular data links (frequency division multiplex).

It is also possible to perform the distribution of the external connection capacities by means of a combined time- and frequency-division multiplex method.

Due to the provision of the communication organization module it is possible that two or more applications simultaneously in each case use one data link via the central communication unit, wherein the communication organization module distributes or assigns the connection capacities in accordance with the predetermined criteria, especially its requirement for connection capacity and/or a priority of the data links.

In a preferred embodiment, the central communication unit has a connection register in which the data links are registered with their current characteristics or parameters, respectively.

In the connection register, one or more of the following parameters of the data link or of the radio channel, respectively, are stored, in particular, in addition to an identification designator for the data link:
    allocation of a radio channel to the respective data link, i.e. entry of an identification designator for the radio channel;
    bandwidth allocated to the data link or data rate of the radio channel, respectively, i.e. the amount of data rate occupied by the data link of the total data rate of the respective data channel;
    current bandwidth or data rate of the radio channel;
    current error rate of the radio channel;
    current latency of the radio channel;
    data transmission costs of the radio channel.

With the aid of the connection register, one or more radio channels is or are allocated to a data link by the communication organization module, i.e. one or more physical connections are assigned to a logical connection.

In the connection register, the same radio channels can be allocated to different data links.

Due to the provision of the connection register in the central communication unit, the individual data links are known in the communication organization module so that the individual data links can be monitored selectively by the communication organization module so that the latter can respond to changes in the connection capacities of the radio channels during the data transmission.

Information about the connection capacities is provided via the connection module manager, the latter periodically updating the corresponding information (bandwidth or data rate, error rate, latency, data transmission costs) of the respective radio channel in the connection register.

The central communication unit preferably has an application profile register in which the requirements or parameters of the applications are entered and which, in addition to an identification designator for the application, comprises one or more of the following parameters:
    allocation of a data link to the respective application;
    current bandwidth or data rate which is available to the application or is granted to it;
    application class, the applications being subdivided into a number of classes such as, for example, emergency call (class 1), traffic messages (class 2), VoIP and streaming telephony (class 3) and ftp applications and web pages (class 4);
    priority for a data link via a particular radio channel;
    minimum data rate with which the application transmits via a data link;
    maximum data rate with which the application transmits via a data link;
    maximum error rate of the data link;
    maximum latency of the data link.

Due to the provision of the application profile register in the central communication unit, the individual applications which transmit data via in each case a data link are known in the communication organization module so that the data transmissions of the individual applications can be monitored selectively by the communication organization module.

By collating the parameters deposited in the application profile register with the parameters of the connection register, the communication organization module can determine before or during a data transmission whether the available connection capacity of the data link is adequate for the requirements of the respective application and decide during a data transmission whether and how it responds to altered connection capacities.

In motor vehicles, a distinction is made between two different types of applications, static applications which cannot adapt their bandwidth requirements and dynamic applications which can adapt their bandwidth requirements. So that the communication organization module can recognize which type of application (static or dynamic) is present, the application profile register preferably has an entry on the minimum data rate and an entry on the maximum data rate with which an application transmits. In the case of a request for a data link, a static application transmits the same value for both entries or alternatively a single value which is transmitted in both entries whereas a dynamic application conveys two different values which represent the minimum and the maximum data rate of the application and which are entered correspondingly. Using these entries, the communication organization module can thus distinguish between dynamic applications and static applications. By means of this distinction, the communication organization module can adapt its response to a change in the connection capacities to the corresponding options of the respective application.

By means of the communication organization module, it is possible to monitor the quality of service of the data links of the individual dynamic applications and, if necessary, to intervene actively in that more connection capacity is allocated to a particular data link or a dynamic application, respectively, and less connection capacity is allocated to one or more other data links or dynamic applications, respectively.

The communication organization module can intervene in the type of transmission of the data link and inform the respective dynamic application of the maximally achievable or available connection capacity of one or more of the data links and the dynamic application can adapt the application modes based on this information. For example, a dynamic application can change the resolution or the codec during the transmission of video streams or video files in order to match the required connection capacity to the available connection capacity.

A dynamic application can be requested by the communication organization module to increase or to reduce the data capacity up to a complete cancellation of a particular data link.

The communication organization module can cancel a particular data link of a dynamic or static application completely and/or send a request to the corresponding applications to terminate the communication so that they quit their respective data link. The latter can be confirmed by a message of the corresponding application to the communication organization module.

The connection capacity becoming available by a cancellation or by the termination of the communication can be allocated to one or more other data links or applications by the communication organization module.

Alternatively, both registers mentioned can be combined in one register within the central communication unit.

Since there is an m:n relation between the radio channels and the data links, the allocation between the two can also be effected by a further register, e.g. by an allocation register.

The number of connection modules are designed for establishing radio links or connections via radio channels in radio systems according to different standards. These standards are, in particular, WLAN, GSM, GPRS, EDGE, 3G/UMTS, HSPA, 4G/LTE, ETSI ITS-G5. Using the connection modules, radio links having different standards can be operated simultaneously or successively. The radio links are controlled in accordance with predetermined criteria which, in particular, are the availability of the radio channels, the bandwidth, the available data rate, the costs, the latency and the error rate. If the motor vehicle is located in a public WLAN network without access restriction and having a high bandwidth, this WLAN network is preferably used. Since such WLAN networks are localized, the system, after leaving this network, automatically switches to another radio channel which can be designed in accordance with the same or a different standard. This is controlled automatically by the connection module manager so that the optimum radio link exists at any time between motor vehicle and external communication partners.

In a method according to the invention for controlling the communication between a number of applications which are executed on devices, connected to a data network, of a motor vehicle, comprising at least one transmitting/receiving device located outside the motor vehicle, by means of a central communication unit, the number of applications can communicate with the transmitting/receiving device in each case via a data link via the central communication unit, and an available external connection capacity between the central communication unit and the at least one transmitting/receiving device is distributed actively in accordance with predetermined criteria to the individual active data links of the applications by means of a communication organization module.

The communication organization module preferably monitors the data flow of the individual data links from and to the individual applications. Monitoring can take place, for example, by detecting data packets by reading the header of such data packets or by detecting the volume of data which are transmitted via particular ports which are in each case allocated to a data link.

If an application of a device of the motor vehicle wishes a data link to be set up, it sends a corresponding request to the communication organization module with which predetermined parameters of the desired data link are transmitted. These parameters are the parameters entered for the respective data link in the application profile register explained above such as, for example, the identification designator of the application, the class of application, the priority of the data link, the minimum or maximum data rate, the maximum error rate, the maximum latency etc., the minimum data rate being equal to the maximum data rate in the case of static applications.

If the central communication unit has a connection register, the communication organization module can find out with the aid of the parameters entered in the latter whether the available external connection capacities are adequate for the data link of the application, correspondingly respond to the request of the application and provide a data link if these are sufficient for the application. In the latter case, the central communication unit enters in the connection register an identification designator for the data link which it transmits at the same time to the application.

If the central communication unit has an application profile register, the communication organization module enters in it the parameters received from the application during the request for later use.

In this method, a central communication unit is used preferably as it is explained above.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
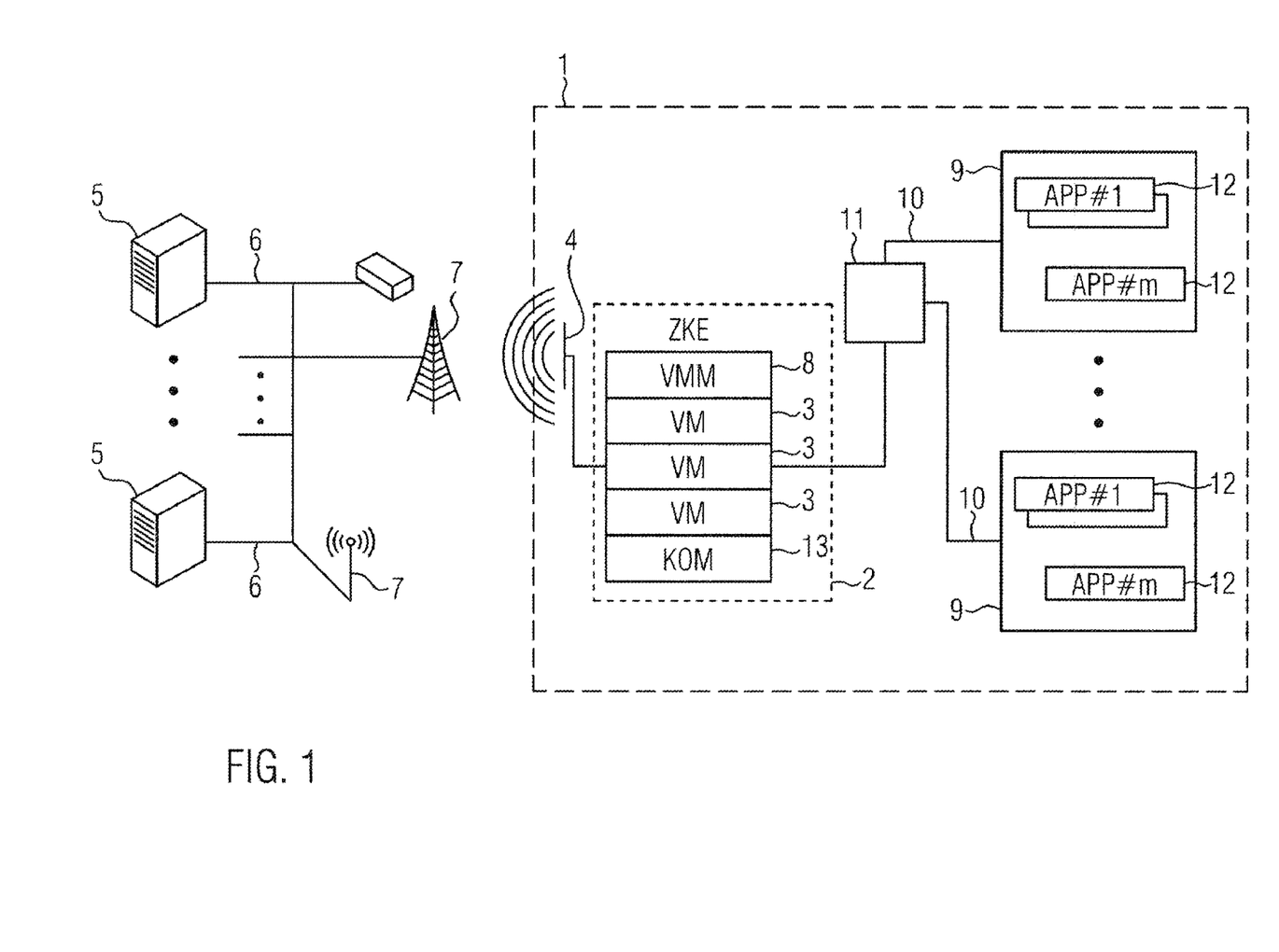
FIG. 1 shows diagrammatically a central communication unit according to the present invention comprising a number of devices of a motor vehicle and a number of radio channels to communication partners.

A motor vehicle 1 has a central communication unit 2 (ZKE) (FIG. 1). The central communication unit 2 comprises a number of connection modules 3 (VM). Each connection module 3 is connected to an antenna 4 by means of which radio signals can be transmitted and received.

Each connection module 3 can establish and maintain a radio channel to external communication partners 5 according to one or more predetermined standards. As a rule, the external communication partners 5 are servers which are connected to transmitting/receiving devices 7 via a data network 6, especially the Internet. The external communication partners 5 can also be natural persons who are connected to corresponding transmitting/receiving devices 7 by means of telephone devices via telephone lines (data network 6), the data link being produced not via the modem of the mobile telephone existing in the motor vehicle 1 but via one of the connection modules 3.

The connection modules 3 are designed, for example, for communicating via the following radio standards: GSM, GPRS, EDGE, 3G/UMTS, HSPA, 4G/LTE, ETSI ITS-G5 and/or WLAN (IEEE802.11a, IEEE802.11b, IEEE802.11ac, IEEE802.11ad, IEEE802.11g, IEEE802.11h, IEEE802.11n, IEEE802.11p). With each connection module 3, at least one radio channel can be operated so that, by providing a number of connection modules 3, a number of radio channels can be operated at the same time which can also correspond to different standards such as, for example, in the case of MIMO (Multiple Input Multiple Output). The individual connection modules 3 are controlled by a connection module manager 8 (VMM) which automatically selects the most suitable radio channels in accordance with predetermined criteria.

The connection module manager 8 thus controls the radio channels between the central communication unit 2 and the external transmitting/receiving devices 7 automatically. This controlling is effected in accordance with predetermined criteria, particularly in accordance with the availability of the individual radio channels, the bandwidth, the available data rate, the costs, the latency and the error rate. If only a narrow bandwidth is needed and a cost-free radio channel having adequate bandwidth is available, this is used, for example, whereas, if a higher bandwidth is needed, a radio channel which may be chargeable but has sufficient bandwidth is used.

The connection module manager 8 has a connection register in which one or more parameters are stored for the respective radio channels or data links, respectively. These parameters comprise, in particular, an identification designator for the data link, the allocation of a radio channel to the respective data link, the data rate allocated to the data link via the radio channel, the current bandwidth or data rate of the radio channel, the current error rate of the radio channel, the current latency of the radio channel and the data transmission costs of the radio channel.

The respective connection module 3 searches cyclically for new radio channels in the corresponding standard or radio system and reports those newly found, and their parameters, to the connection module manager 8. Similarly, it reports a loss of a radio link or a change of the parameters to the latter.

By means of an update of the values in the connection register, performed periodically, the connection module manager 8 ensures that the current values are always entered in the connection register.

If a loss or a change of a radio channel is determined, the connection module manager 8 can instruct the corresponding connection module 3 to search for a new radio channel in its associated radio system.

A number of devices 9 are connected to the central communication unit 2 via a data network 10. In the present exemplary embodiment, the data network 10 is Ethernet. The data network can have one or more switches 11 for branching out the data network. On each device, at least one application 12 is provided which, in operation, needs a logical data link via the central communication unit 2 to an external transmitting/receiving device 7, where the applications 12 can be of the static type or of the dynamic type.

The central communication unit 2 has a communication organization module 13 (KOM) which distributes the available external connection capacities between the central communication unit 2 and the external transmitting/receiving devices 7 actively to individual active data links of the applications 12 in accordance with predetermined criteria.

The communication organization module 13 has an application profile register in which one or more parameters for the respective static and/or dynamic applications 12 are stored. These parameters comprise, in particular, an identification designator for the application 12, an allocation of a data link, the data rate currently allowed to the application via the associated data link, the application class, the priority for a data link via a particular radio channel, the minimum data rate of the data transmission of the application 12, the maximum data rate of the data transmission of application 12, the maximum error rate and the maximum latency of the data link. Storage of the data rate, currently granted to the data link of the application 12, in the application profile register is optional since it is a result of the sum of the data rates, allocated to the respective radio channels, of the data link of the application which are stored in the connection register.

Alternatively, the communication organization module 13 can have the connection register and/or the connection module manager 8 can have the application profile register.

The communication organization module 13 can divide the connection capacities between the individual active data links in accordance with predetermined criteria. These criteria are mainly the requirement for connection capacity of the different data links and/or their priority.

The priority can be specified explicitly by corresponding specifications. The priority, however, can be obtained implicitly, for example by means of the application classes.

A typical breakdown of the application classes can look as follows:

$1^{st}$ class: emergency call;
$2^{nd}$ class: traffic messages;
$3^{rd}$ class: telephone call, VOIP and streaming of audio and/or video files such as, for example, radio streaming, music streaming or video streaming;
$4^{th}$ class: ftp applications and web pages.

The individual classes are sorted in accordance with their priority, $1^{st}$ class having the highest priority and $4^{th}$ class having the lowest priority.

Once application classes are entered in the application profile register, the communication organization module 13 can decide in dependence on the existing application classes which data link has a higher priority and which data link has a lower priority and, in the case of bottlenecks in connection capacities, reduce the corresponding connection capacities for data links having a lower priority.

Figure 2:
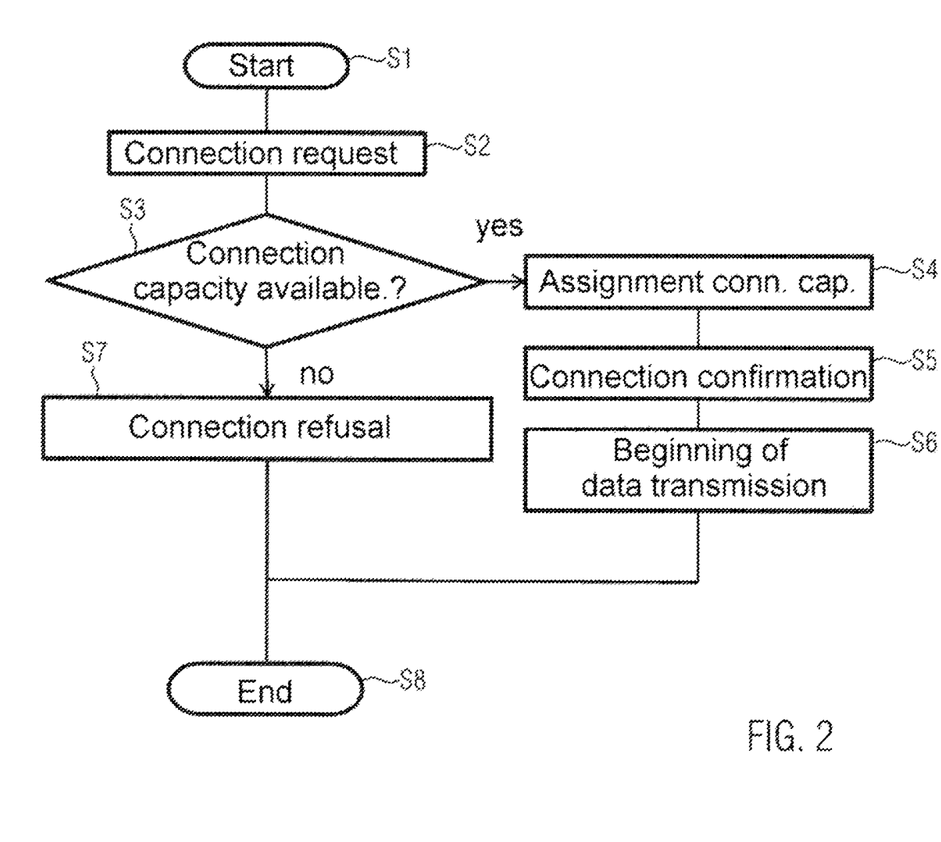
FIG. 2 shows a method for registering a data link in a flowchart.

In the text which follows, the structure of a data link is explained by means of FIG. 2 from the point of view of the communication organization module 13:

The method begins with step S1. In step S2, a connection request is received from an application 12.

The connection request is checked (step S3) to see whether corresponding connection capacities are available. The communication organization module 13, by reading out the entries in the connection register, determines whether an adequate data link is possible. During the checking of the connection request, the parameters transmitted with the connection request are read out and taken into consideration and if there are already connections via radio channels, compared with these. Furthermore, the entire available external connection capacity is determined. Depending on these parameters, it is decided whether sufficient external connection capacity is available for the present connection request.

The allocation of the connection capacity to a data link can be effected by the communication organization module 13 additionally with regard to minimizing the transmission costs.

If an adequate external connection capacity is available, the method sequence goes to step S4 in which the corresponding connection capacity is assigned to the application 12. In this context, the entries in the connection register are duplicated and adapted, if necessary, in that the data link to be newly generated is allocated to the corresponding radio channel or the corresponding radio channels by entering an identification designator for the data link, and the parameters transmitted with the connection request and the identification designator of the data link for the allocation of the data link to the application 12, together with the granted data rate are entered in the application profile register of the communication organization module 13. By this means, the corresponding connection capacity is reserved and the logical data link set up, respectively, for the application 12 posing the connection request. In step S5, the communication organization module 13 sends a connection confirmation, with the granted data rate in the case of dynamic applications 12, to the application 12 posing the connection request. After receiving the connection confirmation, application 12 begins with the data transmission (step S6) via the data link set up by the communication organization module 13.

If it is found in step S3 that no adequate connection capacity is available, the method sequence changes to step S7 in which the communication organization module 13 sends to the application 12 posing the connection request a connection refusal, i.e. a message which contains that no data link can be set up.

In step S7 the communication organization module 13 can send, together with the connection refusal, to the application 12 posing the connection request a message in which the available connection capacity or the data rate, error rate and/or latency currently possible are transmitted so that the respective application 12, if it is an application 12 of the dynamic type and its service to be rendered allows it technically, can pose a new request with altered parameters or with lower requirements. Thus, the method is carried out again.

After steps S6 and S7, the method for setting up a data link is ended (step S8).

If the application 12 has received a connection refusal, it can send out a connection request again at a later time.

If a data link has been set up, on the other hand, the communication organization module 13 monitors the volumes of data transmitted via the respective data links and the available external connection capacities. If the external connection capacities change, they can be redistributed between the existing data links and the applications 12, respectively. If the external connection capacities are reduced, less connection capacity can initially be assigned to the data links of the dynamic applications 12 having lower priority. If this is not sufficient for providing sufficient data rate to all applications 12, less connection capacity can also be assigned to the dynamic applications 12 having a higher priority. If this is then still not sufficient and all dynamic applications 12 have set their lowest possible data rate, the static applications 12 can be terminated by sending a termination message via the communication organization module 13 in the order of their priority (from the lowest to the highest priority) or their data link can be cancelled. If the external connection capacities are increased, the data links of the dynamic applications 12 having a higher priority can initially receive more connection capacity. If even further connection capacities are available, more connection capacity can also be allocated to the data links of the dynamic applications 12 having a lower priority. Since the connection capacity of the individual radio channels or their data rate, respectively, frequently change along the route during a trip with the motor vehicle, changes can occur correspondingly in the assignments of the connection capacities.

In the present exemplary embodiment, the data network between the central communication unit 2 and the devices 9 is an Ethernet in which the data are transmitted in packets. Each packet has a header which contains, on the one hand, information on the application which has generated the data packet and information on the volume of data contained in the packet. This information can be read by the communication organization module 13 so that the individual packets can be allocated to the respective applications 12 or their respective data links, respectively. Using the volume of data found in this context, the data flow can be monitored in the individual data links. The packets of the different applications 12 are transmitted in accordance with the assigned connection capacities via the radio channel between the central communication unit 2 and the transmitting/receiving devices 7. Thus, for example, data packets of a data link to which a greater connection capacity is allocated are transmitted more frequently than data packets of another data link to which a lesser connection capacity is allocated. By this means, a virtually simultaneous transmission of the data is achieved on the different data links in accordance with the connection capacities set.

If the data link is no longer needed, the entry allocated to the data link or application 12 in the application profile register is deleted. In addition, the corresponding allocation of a radio channel or of a number of radio channels to the data link is cancelled in the connection register in that the identification designator of the data link is deleted in all entries existing for the data link to be cancelled. After that, these entries are all deleted if the radio channels entered there are still allocated to at least one other data link in each case. If, however, the radio channels entered there are not allocated to any other data link, all these entries are deleted apart from a single one. As a result, the entries of the radio channels which are currently are not allocated to any data link are retained in the connection register for a redistribution of the connection capacities. By means of this method, the connection capacities are released and a possible redistribution of the connection capacities is prepared.

The end of a communication process carried out over a particular data link can be reported to the communication organization module 13 either by a corresponding message of the respective application 12 or determined directly by the communication organization module 13 by means of the analysis of the data transmitted.

The communication organization module 13 can terminate the transmission of the respective application 12 even in the case of inadequate connection capacities or supply the latter with a termination message.

By means of the central communication unit 2 explained above, a number of applications 12 can thus in each case operate a logical data link to external communication partners 5, the distribution of the connection capacity being adapted dynamically to the changing connection capacities changing, as a rule, permanently along a traveling route. It is also ensured that important messages and information are transmitted with increased priority so that in the case of small connection capacities, their transmission is ensured.

The communication organization module 13 can also intervene in the requirement for capacity of the individual applications 12 in that it informs a dynamic application 12 of the maximum achievable or available data rate or the entire available connection capacity of the radio channels with the connection refusal (step S7), wherein the dynamic application 12 can adapt its capacity requirement by adjusting one of its application routes based on its capacity requirement. For example, a dynamic application 12 can change the type of transmission such as, for example, the codec in order to thus adapt the connection capacities of the individual data links to the available total external radio connection capacity. In the case of a high connection capacity, images, films and music are transmitted, for example, with higher quality than in the case of lesser connection capacity whereas in the case of little connection capacity, for example, the resolution of a video stream or the data rate is reduced by dynamic/adaptive streaming in that corresponding streaming methods are used such as, for example, DASH or SVC.

Figure 3A:
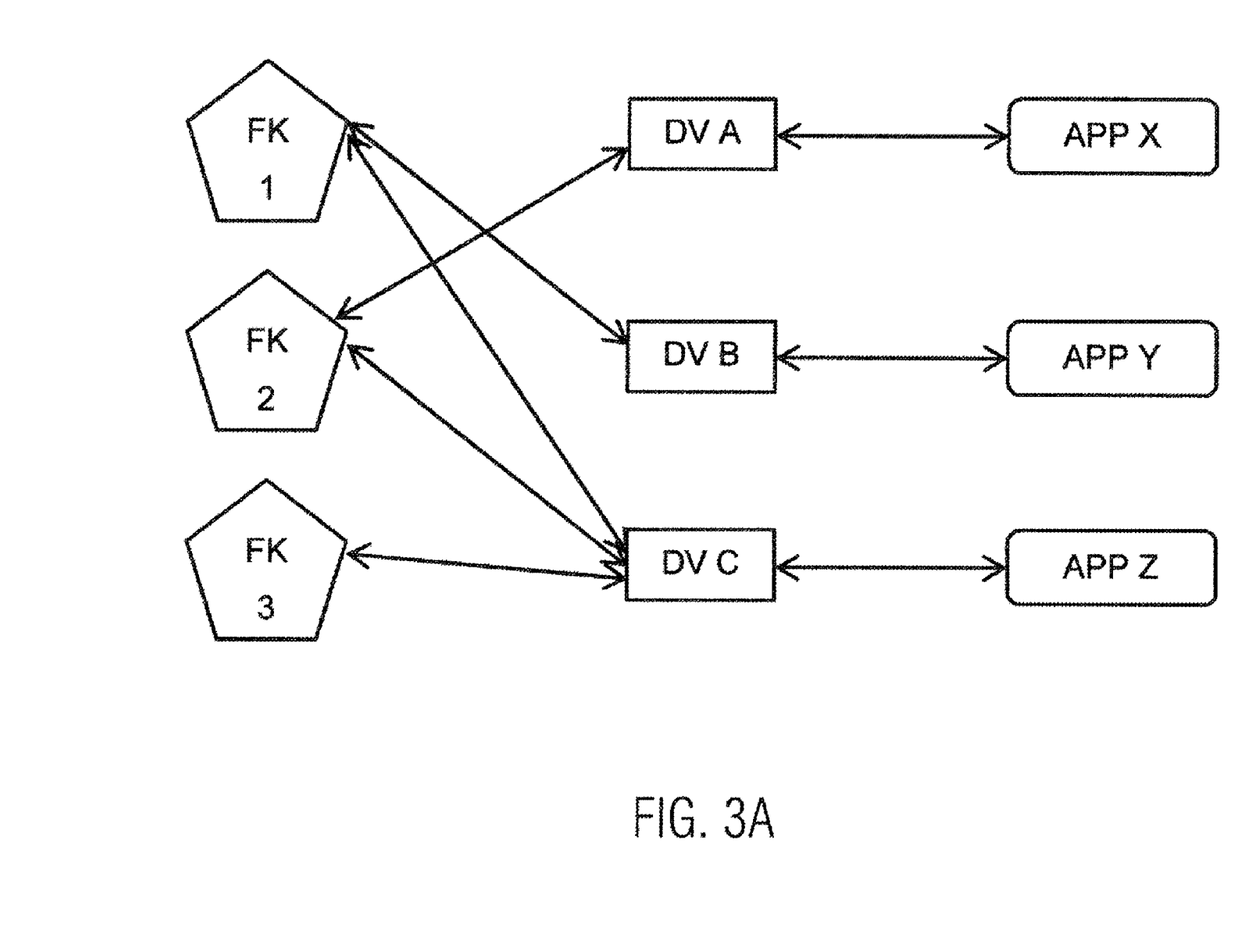
FIG. 3A diagrammatically shows allocations of a number of radio channels to a number of data links and of these to a number of applications (FIG. 3A), the allocations being represented by arrow connections, together with a representation of an associated connection register (FIG. 3B) and of an associated application profile register (FIG. 3C).

FIG. 3A shows diagrammatically an allocation of various radio channels (FK) FK1, FK2 and FK3 to various data links (DV) A, B and C, radio channel FK1 being allocated to data links B and C, radio channel FK2 being allocated to data links A and C and radio channel FK3 being allocated to data link C. Furthermore, FIG. 3A shows the allocation of data links A, B and C to applications (APP) X, Y and Z, application X being allocated to data link A, application Y to data link B and application Z to data link C.

Figures 3B, 3C:
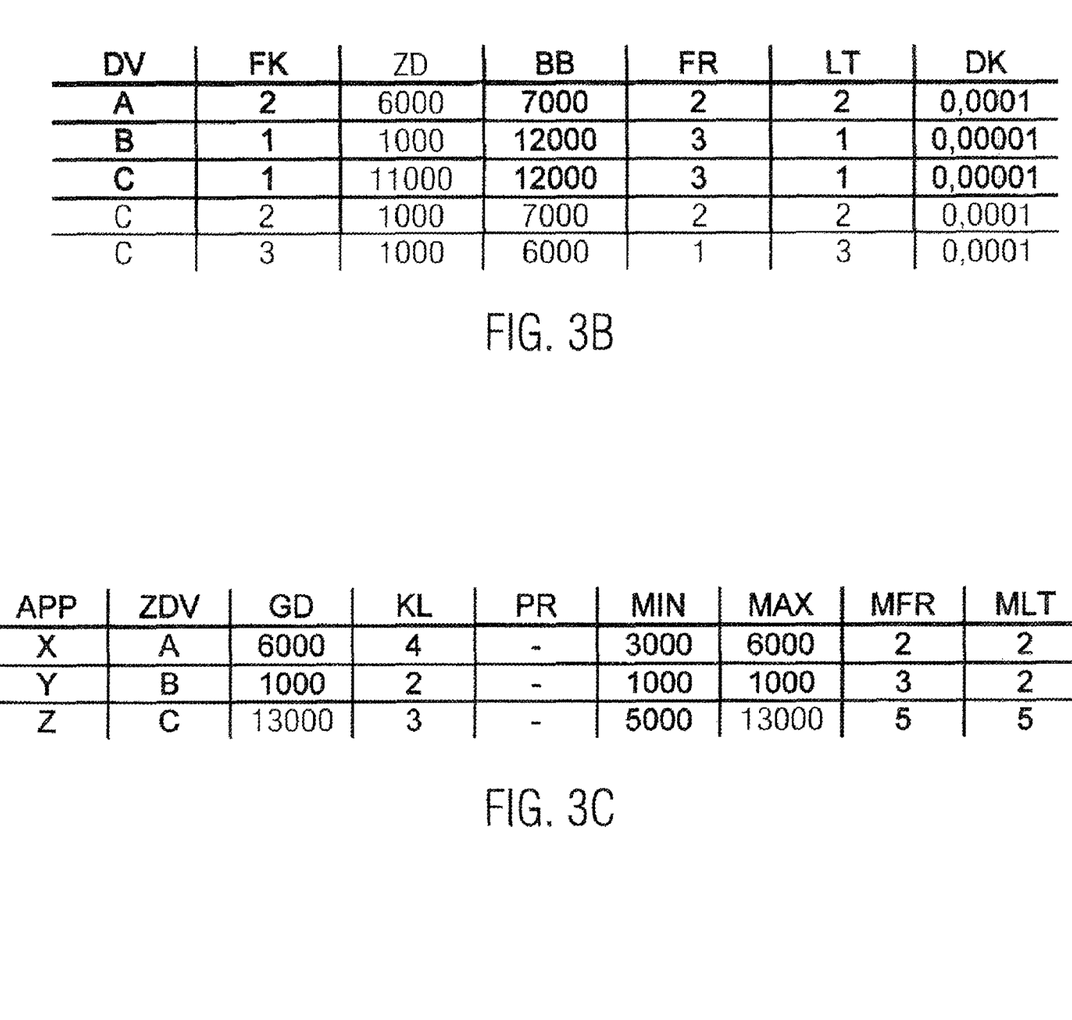

The associated entries in the connection register are shown in FIG. 3B with the abbreviations DV for data link, FK for radio channel, ZD for the data rate, allocated to the data link, of the radio channel in kBit/s, BB for current bandwidth or data rate of the radio channel in kBit/s, FR for current error rate of the radio channel in kBit/s, LT for current latency of the radio channel in ms, and DK for volume-dependent data transmission costs of the radio channel in ct/kBit. The data transmission costs can also be time-dependent (for example in the unit ct/s) so that the connection module manager 8 recalculates these costs with the aid of the data rate or bandwidth or of the connection capacity into volume-dependent data transmission costs before it enters them in the register.

In the text which follows, n represents a running index for the respective radio channel FK, n varying between 1 and 3 since in the present example, there are 3 radio channels. The number of radio channels can change with time.

A calculation of the connection capacity VK(n) available via a radio channel n can be performed by combining the parameters stored in the connection register for the current bandwidth or data rate of the radio channel BB(n) and for the current error rate of the radio channel FR(n) in that the error rate FR(n) is subtracted from the bandwidth BB(n).

This calculation is advantageously carried out only once per radio channel during an access of the communication organization module 13 to the connection register, the following values being produced, for example:

$VK(1)=12000$ kBit/s$-3$ kBits$=11997$ kBit/s $VK(2)=7000$ kBit/s$-2$ kBits$=6998$ kBit/s $VK(3)=6000$ kBit/s$-1$ kBits$=5999$ kBit/s The entire available connection capacity (GVK) is determined by addition of the individual values of the radio channels:

$GVK=11997$ kBit/s$+6998$ kBit/s$+5999$ kBit/s$=24994$ kBit/s

An order of allocation of the connection capacity available via radio channel, taking into consideration the data transmission costs, can be produced by sorting the radio channels in accordance with their data transmission costs from the least to the most expensive radio channel. If there is a number of radio channels with the same data transmission costs, these can be sorted in accordance with their data rate or bandwidth or connection capacity from the fastest one to the slowest one. In the present exemplary embodiment, the following order is obtained by this method:

$FK1, FK2, FK3$

FIG. 3C shows the associated application profile register, with abbreviations APP for the identification designator of the application, ZDV for the associated data link, GD for the granted data rate in kBit/s, KL for application class, PR for priority over a particular radio link, MIN for minimum data rate in kBit/s, MAX for maximum data rate in kBit/s, MFR for maximum error rate in kBit/s, MLT for maximum latency in ms of the application 12.

Storage of the data rate GD currently granted to the data link of the application 12, in the application profile register is optional since it is obtained from the sum of the data rates ZD, allocated to the respective radio channels, of the data link of the application which are stored in the connection register.

If an application 12 requests a data link, the communication organization module 13 checks its parameters and allocates to application 12 a data link which meets the requirements of the application with regard to the data rate or bandwidth, the error rate, the latency and/or the priority of the data link over a particular radio channel. The allocation can take place in increasing order according to data link costs.

The allocation method resulting in the register values shown in FIGS. 3B and 3C will be described in the text which follows:

Firstly, application X has requested a data link. Due to its restrictions by its maximum error rate and latency, only one of the least cost-effective radio channels, radio channel FK2, could be allocated to it or its data link A, respectively. Then application Y requested a data link according to which the most cost effective radio channel FK1 could be allocated to this application or its data link B, respectively. Since the remaining connection capacities of radio channel FK1 and after that of radio channel FK2 were not sufficient for completely meeting the subsequent request of application Z, a first part of its data link C was allocated to the most cost effective radio channel FK1, a second part of its data link C to one of the least cost effective radio channels, radio channel FK2, and the third and remaining part to the other one of the least cost effective radio channels and to the slowest radio channel FK3.

Figure 4:
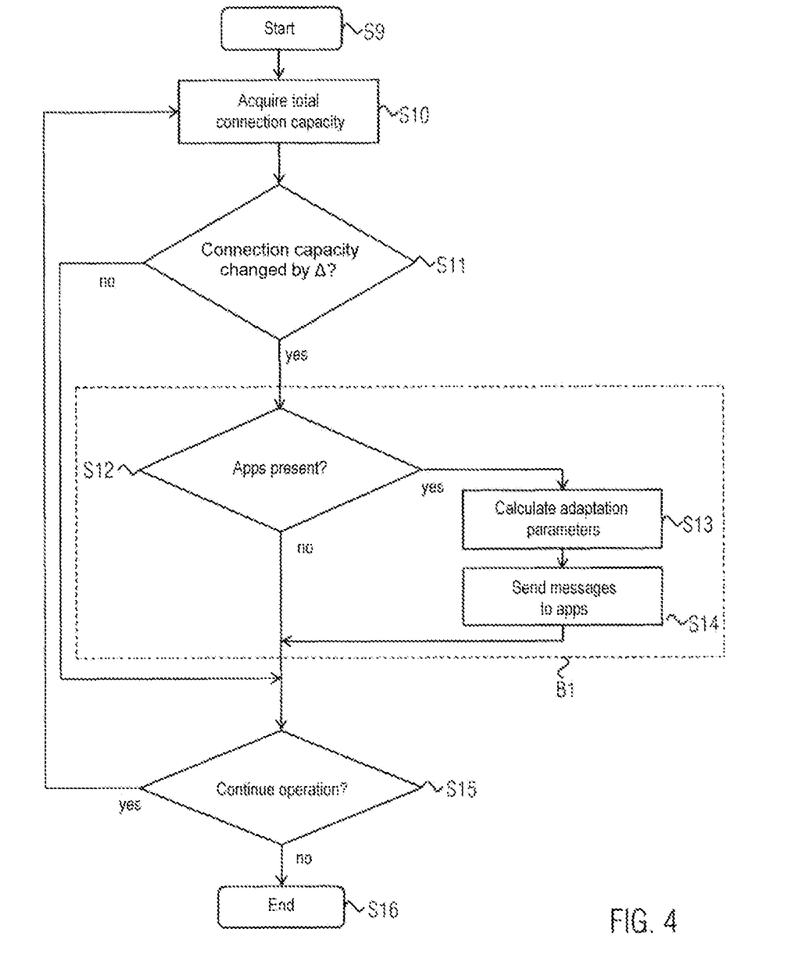
FIG. 4 shows a method for administering the data links in a flowchart, there being a connection register and an application profile register and a method section (block) B1 comprising individual steps of the method.

In the text which follows, a method for managing the data links from the point of view of the communication organization module 13 is explained by means of FIG. 4, these being monitored and possibly cancelled and/or redistributed. In this method, a central communication unit 2 is used which has a connection register and an application profile register, and in each case provided with the entries described above:

The method begins with step S9.

In step S10, the communication organization module 13 determines the entire available connection capacity in that it combines the parameters entered in the connection register by the connection module manager 8 with one another as is described above.

The communication organization module 13 checks in step S11 whether the connection capacity has changed at least by a predetermined threshold value Δ, i.e. has become increased or reduced. This threshold value Δ represents a tolerance value and describes how large a change of the connection capacity has to be for a redistribution to be carried out. By using it, the communication organization module 13 distributes the available external connection capacities between the applications 12 only when the total external connection capacity has changed by at least the threshold value Δ. This is advantageous since then minor (less than Δ) fluctuations occurring frequently of the entire available external connection capacity are not considered and thus do not lead to a direct redistribution of the connection capacities of the data links or applications 12, respectively.

In this context, the threshold value Δ can depend on the total external connection capacity distributed last, on the requirements of applications 12 and/or on the entire available connection capacity or be a fixed value. For example, it can be proportional to the total available connection capacity and can thus change dynamically, i.e. the lower the connection capacity, the lower the threshold value Δ. Alternatively, or in combination, it can depend on the capability of the applications to be able to change the data rate used by a considerable amount during the operation. For example, in the case of applications which are capable of independently adapting themselves to a lesser one than their granted data rate, the threshold value Δ can be determined to be correspondingly greater.

The value of Δ can also comprise a safety amount so that with a complete distribution of the entire external connection capacity and with a subsequent reduction of this total external connection capacity which is less than Δ, sufficient connection capacity is still available in each case to the individual data links or applications 12 even without redistribution.

If the connection capacity has changed by more than the predetermined threshold value Δ, the method sequence changes to step S12 in which the communication organization module 13 determines whether there are applications 12. In this context, the entries in APP are preferably read out. Alternatively, the other entry can be read out, e.g. in ZDV, in MIN and/or in MAX. If there is an entry, there is also an active or data-transmitting application 12.

When there are applications 12, the communication organization module 13 calculates in step S13 the respective adaptation parameters for the active applications 12.

The adaptation parameters describe the changes to be performed by the respective applications 12 for using a particular connection capacity assigned to application 12, particularly of one or more particular radio channels. Using the adaptation parameters, a redistribution of the allocation of the radio channels to the data links can take place, and in the case of a radio channel, a redistribution of the connection capacity occupied by the respective data links.

This calculation can or should, respectively, lead to an optimal distribution of the connection capacity between the data links of the individual applications 12 so that each application 12 obtains an adequate data link and the total data transmission costs are preferably as low as possible.

The adaptation parameters can be calculated in such a manner that firstly an adequate connection capacity is assigned to all static applications 12 in accordance with their requirements in the order of their storage in the application profile register. If this is not possible because, e.g., an inadequate connection capacity is available, e.g., for the requirement of the static application, no connection capacity is allocated to the respective static application 12. Following this, a possibly remaining connection capacity is uniformly distributed to the dynamic applications 12.

This method can be modified by taking into consideration further parameters such as, e.g., the data rate ZD allocated, the data rate GD granted, the priority or class KL, the minimum data rate MIN, the maximum data rate MAX, the maximum error rate MFR and/or the maximum latency MLT.

If further parameters are taken into consideration, the order of calculating the adaptation parameters for the respective type of application can be exchanged, i.e. the calculation of the adaptation parameters for the static applications follows the calculation of the adaptation parameters for the dynamic applications 12.

As an alternative to the said example of calculating the adaptation parameters, it can be attempted, after allocation of the connection capacity to the static applications 12 and presence of residual connection capacity, firstly to allocate to the dynamic applications 12 the maximum connection capacity requested by them. Should this not be possible because, e.g., there is not sufficient connection capacity, one or more dynamic applications 12 can be selected, for example in the order of storage in the application profile register, and the connection capacity of this application 12 be reduced step by step to its connection capacity requested as a minimum. If there is then still no adequate connection capacity, one or more dynamic applications 12 are not allocated any connection capacity.

The calculation of the adaptation parameters can be carried out by running through the allocation method listed in the description of FIG. 3C in the order of applications 12 according to their class with decreasing priority, i.e. a radio channel or a distribution to a number of radio channels is determined which is adequate for the respective application 12 with regard to its parameters and is as cost effective as possible.

If the priority and the maximum data rate of the application 12 is taken into consideration in the distribution of the connection capacity to the individual radio channels and the existing connection capacity distributed accordingly to individual data links, it may be that no further connection capacity is available for further data links. In such a case, the calculation of the adaptation parameters can be continued in that a lower data rate, which at least corresponds to the data rate requested by the application 12, is determined for the dynamic applications 12 successively in accordance with their class with increasing priority, and is included in the calculation.

Should this still be not enough for providing an adequate data link for all active applications 12, one or more static applications 12 can be determined successively in accordance with their class with increasing priority which are then not to receive any connection capacity.

If there is still no possibility of an adequate data link for all active applications 12, one or more dynamic applications 12 can be determined lastly successively in accordance with their class with increasing priority which are not to receive any connection capacity, i.e. which should be terminated.

In the case of identical or similar parameter values such as, e.g. identical priority, the selection of a particular application 12 can be carried out in accordance with the principle of random selection (e.g. by means of pseudorandom numbers).

The adaptation parameters are sent to the applications 12, which have to become adapted to altered connection capacities, in step S14 via messages. To the dynamic applications 12, whose connection capacity can be increased or has to be reduced, respectively, the new values for the connection capacity are sent as a message and to the static applications 12, the data link of which is cancelled or which have to be terminated, this is communicated with a termination message. This message can be, for example, one with a contained connection capacity equal to 0.

As an alternative, a message which contains all adaptation parameters or all parameters for the active applications 12 can also be sent successively to each application 12 or simultaneously to all applications 12 via a broadcast.

In the case of the dynamic applications 12 which have to change their data rate but should not be terminated, the granted data rate is entered in the application profile register. If an application 12 is to be terminated, the corresponding entries of the application 12 in the application profile register are deleted.

Then the entries in the connection register are possibly updated in accordance with a new allocation of the connection capacities.

Following the received message, the dynamic applications 12 adapt themselves in accordance with the transmitted adaptation parameters, i.e. they set their granted data rate and the dynamic and static applications 12 which have received a termination message are terminated.

After step S14, step S15 is carried out in which it is checked whether the operation is to be continued. If it has been found in step S11 that the connection capacity has changed by at least the threshold value Δ, a new calculation of the threshold value Δ can take place in the same step S15, wherein the newly determined distribution of the connection capacity or the adaptation parameters determined in step S13 can be taken into consideration.

If execution of the method is to be continued, step S10 is carried out after that. If not, the method ends in step S16.

If it is found in step S11 that the connection capacity has not changed by the predetermined threshold value Δ explained above, the method is continued with execution of step S15.

Figure 5:
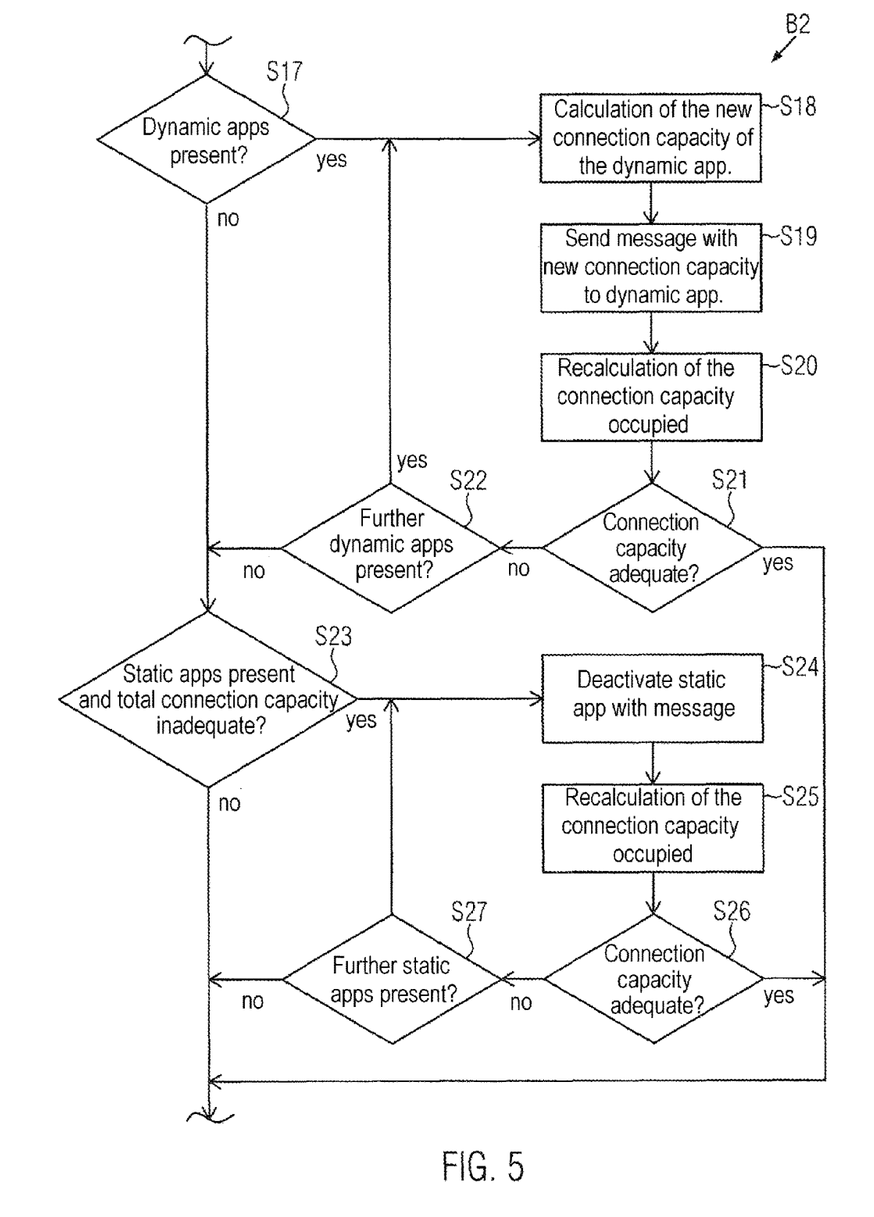
FIG. 5 shows individual steps of a method section (block) B2 of a method for administering the data links in a flowchart, there being a connection register and an application profile register and the method section B1 of FIG. 4 being replaceable by the method section B2 of FIG. 5.

Steps S12, S13 and S14 represent a method section (block) B1 for adapting the connection capacity when the connection capacity found has changed by the predetermined threshold value Δ. Instead of this method section B1, a preferred method section (block) B2 can also be used which is shown in FIG. 5 and, in turn, extends between steps S11 and S15 from FIG. 4.

After a change of the connection capacity by at least the predetermined threshold value Δ has been found in step S11, method section B2 begins with step S17 in which it is checked whether dynamic applications 12 are present. In this context, the entries in MIN and in MAX are read out and their values are compared with one another. If their values are different, there is at least one dynamic application 12 in existence. If dynamic applications 12 are present, the communication organization module 13 selects such an application 12. This selection takes place preferably in accordance with the class or priority of the dynamic application 12 with increasing priority, but can also be determined in accordance with other parameters such as, e.g., the order of dynamic applications 12 in the application profile register or their maximum possible change with respect to their data rate.

If it is found in step S17 that there are dynamic applications 12 and one is accordingly selected, the new connection capacity provided for the application is calculated for this application 12 in step S18. During this process, the change of the entire connection capacity is included in the calculation. During this process, attention is paid to the fact that application 12 receives an adequate connection capacity, i.e. it must be at least equal to the corresponding value in MIN.

Following this, a message is sent to the selected dynamic application 12 in step S19 with which the application is requested to adapt its connection capacity.

In the subsequent step S20, the newly occupied connection capacity is calculated by addition of the new connection capacity, determined in step S18, of the selected dynamic application 12, with the connection capacities which are allocated to the other applications 12.

In step S21 it is then checked by comparison if the entire connection capacity is sufficient for the connection capacity newly occupied.

If this is not so, step S22 is carried out in which it is checked whether there are further dynamic applications 12.

If there are further such applications, another dynamic application 12 is selected in accordance with class or priority with increasing priority and the method sequence is continued with step S18. Instead of according to class, the selection can also be determined in accordance with other parameters such as, e.g., the order of the dynamic applications 12 in the application profile register or their maximum possible change with respect to their data rate.

If the execution of step S21 shows that the entire connection capacity is adequate for the connection capacity newly calculated, method section B2 is left and step S15 (FIG. 4) is carried out.

If it is found in step S22 that there are no further dynamic applications 12 for a selection, step S23 is carried out in which it is checked whether there are static applications 12 and the entire connection capacity is not adequate. For the checking for the presence of static applications 12, entries in MIN and in MAX are read out and their values are compared with one another. If their values are equal, there is at least one static application 12 present. If there are static applications 12, the communication organization module 13 selects such an application 12. This selection is carried out preferably in accordance with class and priority of the static application 12 with increasing priority, but can also be determined in accordance with other parameters such as, e.g., the order of the static applications 12 in the application profile register or their data rate.

If it is found in step S17 that no dynamic applications 12 are present, execution of step S23 follows.

If the execution of step S23 shows that there are static applications 12 and the entire connection capacity is not adequate, and an application 12 is selected in consequence, a termination message is sent to the selected static application 12 in step S24.

In the subsequent step S25, the connection capacity newly occupied is calculated by subtraction of the connection capacity of the static application 12 terminated in step S24 from the connection capacity occupied. Alternatively, the connection capacities can be added together which are allocated to the other applications 12, i.e. all active applications 12 without the application 12 to be terminated.

It is then checked in step S26 by comparing whether the entire connection capacity is sufficient for the connection capacity newly occupied.

If this is not so, step S27 is carried out in which it is checked whether further static applications 12 are present.

If there are further such applications, another static application 12 is selected in accordance with class or priority with increasing priority and the method sequence is continued with step S24. Instead of in accordance with class, the selection can also be determined in accordance with other parameters such as, e.g., the order of the static applications 12 in the application profile register or their data rate.

If it is found in step S26 that the entire connection capacity is sufficient for the connection capacity newly calculated, the method section B2 is left and step S15 (FIG. 4) is carried out.

If the execution of step S27 has shown that no further static applications 12 are present, the method section B2 is left and the method sequence is continued with the execution of step S15 (FIG. 4).

If the execution of step S23 shows that no static applications 12 are present or the total connection capacity has not been reduced or is adequate, method section B2 is left and step S15 (FIG. 4) is carried out.

If it has been found in step S11 that the connection capacity has changed by at least the threshold value Δ, a new calculation of the threshold value Δ can take place in the same step S15, wherein the newly determined distribution of the connection capacity or the adaptation parameters determined in step S18, respectively, can be taken into consideration. In the case of the dynamic applications 12 which have to change their data rate but should not be terminated, the granted data rate is entered in the application profile register. If an application 12 is terminated, the corresponding entries of application 12 are deleted in the application profile register.

The entries in the connection register are then possibly updated in accordance with a new allocation of the connection capacities.

Alternatively, in an extended method, if the connection capacity is not adequate and there are no static applications 12, either because there were none present or after their termination, the possibly existing dynamic applications 12 can be terminated before leaving the method section B2 and executing step S15 (FIG. 4). For this purpose, from the dynamic applications 12, one is selected according to class or priority with increasing priority, a termination message is sent to it and then the occupied connection capacity is determined again. Should this not be adequate, the next dynamic application 12 is selected to which a termination message is sent etc. If, however, the connection capacity is sufficient, method section B2 is left and step S15 (FIG. 4) is executed. The selection of the dynamic application 12 can also be determined, instead of according to class, according to other parameters such as, e.g., the order of such applications 12 in the application profile register or their data rate.

The invention can be summarized briefly as follows:

The invention relates to a central communication unit of a motor vehicle and a method for controlling the communication between a number of applications by means of such a central communication unit. The central communication unit has a communication organization module which can distribute the available external radio connection capacities between the central communication unit and at least one transmitting/receiving device actively in accordance with predetermined criteria to individual active data links of the applications. In the central communication unit, the existing external radio connection capacities are thus distributed selectively controlled between the individual data links of the individual applications. The criteria for this are mainly the requirement for connection capacity and/or the priorities of the different data links.

LIST OF REFERENCE DESIGNATIONS

| | |
|---|---|
| 1 | Motor vehicle |
| 2 | Central communication unit |
| 3 | Connection module |
| 4 | Antenna |
| 5 | External communication partner |
| 6 | Data network (Internet) |
| 7 | Transmitting/receiving device |
| 8 | Connection module manager |
| 9 | Device |
| 10 | Data network |
| 11 | Switch |
| 12 | Application |
| 13 | Communication organization module |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A central communication unit of a motor vehicle, comprising:
a plurality of connection modules that establish wireless data links between a transceiver of the motor vehicle and at least one transmitting/receiving device located outside the motor vehicle;
a connection module manager that controls the connection modules to establish the wireless data links;
a communication organization module that, in accordance with predetermined criteria, distributes available external connection capacities of the wireless data links among a plurality of software applications executed by devices located inside the motor vehicle and communicatively coupled to the central communication unit via a data network,
wherein the distribution is based on whether the software applications are respectively determined to be dynamic applications, for which requests for wireless data links by the software application include different values for maximum and minimum data rates at which the software application transmits data, or static applications, for which requests for wireless data links by the software application include a single value for both maximum and minimum data rates at which the software application transmits data.

2. The central communication unit as claimed in claim 1, wherein the distribution of the external connection capacities is in accordance with one or more of the following predetermined criteria: a requirement for a particular connection capacity, an efficient distribution of the wireless data links among the software applications, a priority of the application, a bandwidth, a latency and/or an error rate.

3. The central communication unit as claimed in claim 1, wherein the communication organization module includes a connection register in which each wireless data link is registered with one or more of the following parameters:
identification designator of the data link,
allocation of a radio channel to the respective data link, bandwidth allocated to the data link or data rate of the radio channel, respectively,
current bandwidth or data rate of the radio channel,
current error rate of the radio channel,
current latency of the radio channel,
data transmission costs of the radio channel.

4. The central communication unit as claimed in claim 1, wherein the communication organization module includes an application profile register in which requirements of each software application are registered with one or more of the following parameters:
identification designator of the software application,
wireless data links allocated to the software application,
bandwidth or data rate granted to the software application,
software application class,
wireless data link via a particular radio channel priority,
software application minimum data rate,
software application maximum data rate,
wireless data link error rate requirements,
wireless data link latency requirements.

5. The central communication unit as claimed in claim 1, wherein:
the connection modules establish radio channels according to different standards, and
the connection module manager controls the radio channels in accordance with the predetermined criteria of: availability, bandwidth, costs, latency, and error rate.

6. The central communication unit as claimed in claim 5, wherein the different standards include: wireless local area network (WLAN), global system for mobile communication (GSM), general packet radio service (GPRS), enhanced data rates for global evolution (EDGE), universal mobile telecommunications system (3G/UMTS), high speed packet access (HSPA), long term evolution (4G/LTE), and automotive intelligent transport systems (ETSI-ITS-G5).

7. A method for controlling communication between a plurality of software applications and at least one transmitting/receiving device located outside of a motor vehicle, the software applications being executed on devices of the motor vehicle, which devices are connected, via a data network, to a central communication unit of the motor vehicle, the method comprising:
establishing wireless data links used by the plurality of software applications to communicate with the transmitting/receiving device; and
distributing, by a communication organization module and in accordance with predetermined criteria, available external connection capacities of the wireless data links among the plurality of software applications,
wherein the distribution is based on whether the software applications are respectively determined to be dynamic applications, for which requests for wireless data links by the software application include different values for maximum and minimum data rates at which the software application transmits data, or static applications, for which requests for wireless data links by the software application include a single value for both maximum and minimum data rates at which the software application transmits data.

8. The method as claimed in claim 7, wherein: the central communication unit communicates with the at least one transmitting/receiving device via a radio channel, the method further comprising:
establishing a plurality of radio channels in accordance with different standards simultaneously or successively; and
controlling the plurality of radio channels in accordance with predetermined criteria, including: availability, bandwidth, costs, latency, and error rate.

9. The method as claimed in claim 8, wherein the different standards include: wireless local area network (WLAN), global system for mobile communication (GSM), general packet radio service (GPRS), enhanced data rates for global evolution (EDGE), universal mobile telecommunications system (3G/UMTS), high speed packet access (HSPA), long term evolution (4G/LTE), and automotive intelligent transport systems (ETSI-ITS-G5).

10. The method as claimed in claim 7, wherein the central communication unit communicates with the devices of the motor vehicle via a cable-connected network.

11. The method as claimed in claim 7, wherein the communication organization module monitors a data flow of the individual data links.

12. The method as claimed in claim 7, further comprising:
setting up a wireless data link via sending a connection request to the communication organization module with which predetermined parameters of the wireless data link are transmitted.

13. A motor vehicle, comprising:
a central communication unit;
a plurality of devices, each device executing at least one software application;
a data network connecting the devices and the central communication unit,
wherein the central communication unit comprises:
a plurality of connection modules that establish wireless data links between the motor vehicle and at least one transmitting/receiving device located outside the motor vehicle;
a connection module manager that controls the connection modules to establish the wireless data links;
a communication organization module that, in accordance with predetermined criteria, distributes available external connection capacities of the wireless data links among the software applications,
wherein the distribution is based on whether the software applications are respectively determined to be dynamic applications, for which requests for wireless data links by the software application include different values for maximum and minimum data rates at which the software application transmits data, or static applications, for which requests for wireless data links by the software application include a single value for both maximum and minimum data rates at which the software application transmits data.

* * * * *